Figure 1:
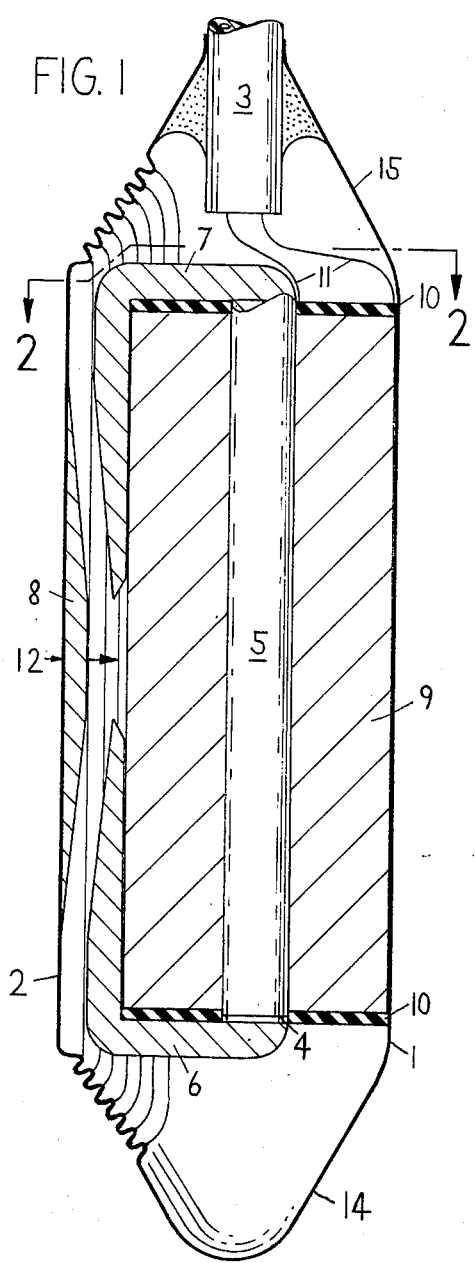

United States Patent [19]
Lehr

[11] 3,906,960
[45] Sept. 23, 1975

[54] MEDICAL ENERGY CONVERTER
[76] Inventor: Siegfried R. Lehr, 8 Munich 60, Negrellist 100, Germany
[22] Filed: Feb. 25, 1974
[21] Appl. No.: 448,730

[30] Foreign Application Priority Data
Feb. 27, 1973 Germany............................ 2309749

[52] U.S. Cl...... 128/419 PG; 128/419 B; 128/419 G
[51] Int. Cl............................................. A61n 1/36
[58] Field of Search.......... 128/419 C, 419 E, 419 P, 128/419 PG, 419 PS, 419 R

[56] References Cited
UNITED STATES PATENTS
3,563,245  2/1971  McLean et al. ................. 128/419 P
3,693,625  9/1972  Auphan........................... 128/419 P Primary Examiner—William E. Kamm

[57] ABSTRACT

A medical energy converter, implantable in a vessel or heart ventricle or in muscle, with gas filled and sealed housing, generating electricity by a bistable magnet spring system, integrated with a reluctance generator, energy storage and release appropriate for stimulation of the heart, carotidsinus, bladder, etc. and integrateable in a pacemaker electrode.

3 Claims, 4 Drawing Figures

US Patent  Sept. 23,1975  3,906,960

MEDICAL ENERGY CONVERTER

THE INVENTION

The invention relates to mechanical to electrical energy converters, implantable in a living body, used for the treatment of many electrical disorders of the body, e.g. heart, carotidsinus, bladder etc.

Presently used batteries show an average like of 2½ years and a significant increase seems not to be possible, as the state of the art is far advanced; biogalvanic elements cause tissue necrosis and nuclear batteries impose a radiation load not negligible in younger patients, besides being more complicated and thus more failure prone and a radioactive hazard. Electromechanical energy generating devices have been tried but were too great in size to be implanted transvenously or involved thoracotomy.

The purpose of the invention is to eliminate all these drawbacks in using an energy converter such small as to be easily implantable transvascularly in a vessel or heart ventricle or in muscle, generation of electricity by means of a bistable magnet spring system integrated with a reluctance generator, energy storage and release appropriate for stimulation of some malfunctioning organ.

THE DRAWING

Figure 3:
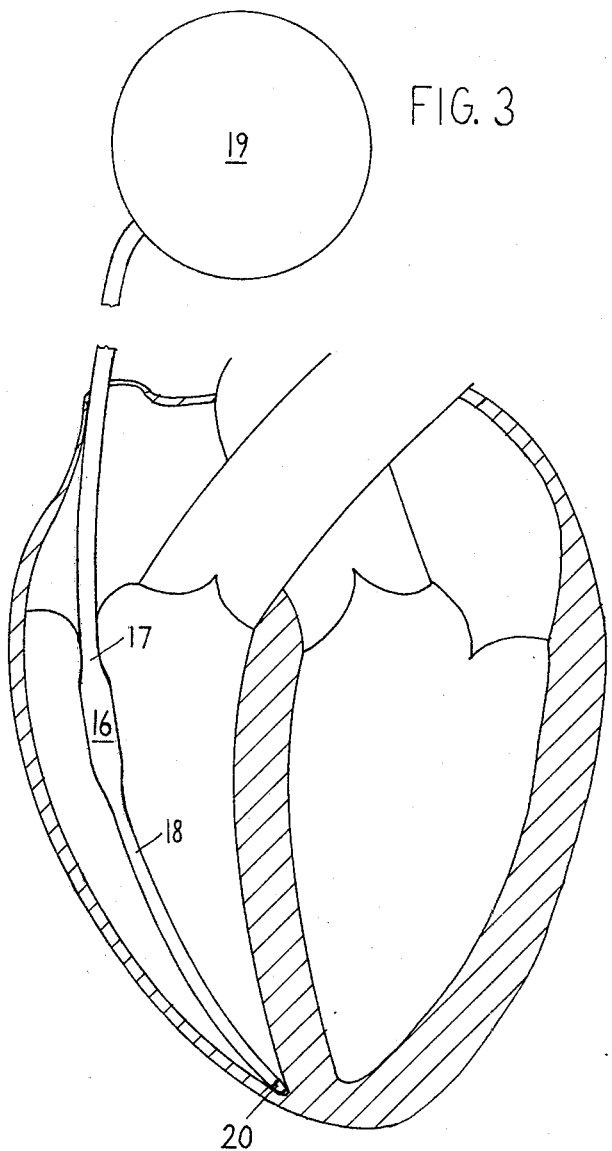
Figure 2:
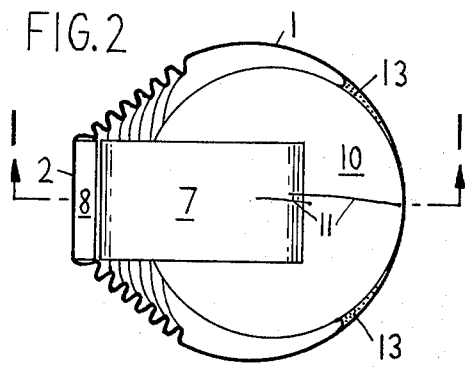
Figure 4:
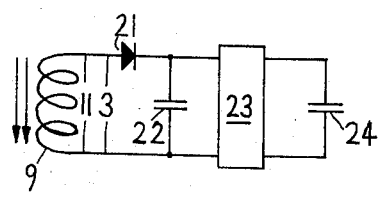

FIG. 1 is an enlarged longitudinal section of the energy converter provided by the invention, FIG. 2 is a cross section of the same, FIG. 3 shows the same integrated in a transvenous electrode for a permanent pacemaker, and FIG. 4 outlines a possible circuit diagram for energy storage.

DESCRIPTION

FIGS. 1 and 2 show the energy converter comprising a reluctance generator, an integrated housing 1 with membrane 2 and output cable 3. The reluctance generator consists of a permanent magnet (preferably CoSm) 4 and a soft magnetic (49%Fe, 49%Co, 2%V), laminated core 5, yokes 6 and 7 and armature 8, forming a magnetic cicuit and a coil 9; with insulating discs 10 and wire ends 11 connected to the output cable 3. The housing 1, for weight and size saving and integration of the membrane 2 is made of thin, body compatible steel sheet like Elgiloy, but even then, acting as integral spring for the bistable magnet spring system, would still be too stiff, therefore, around the membrane area, is corrugated. For assembly, at 12 the armature 8 is fastened to the membrane; The permanent magnet 4 is fastened preferably by adhesive in the magnetic circuit, the stationary part of the reluctance generator fastened with adhesive at 13, the front 14 or rear 15, respectively, of the housing 1 is e.g. electron beam welded to close the housing. The assembled unit may be filled with inert gas to avoid corrosion; when sealed, care must be taken to ensure proper position of the membrane 2 relative to the yokes 6 and 7.

Spring constant of the corrugation and magnet force have to be adapted to each other in such a way that when the ambient pressure in the vessel or muscle, where the energy converter is implanted, increases, as during systole or muscle contraction, respectively, the membrane with armature moves closer to the yokes until it latches, storing energy in the spring; when the ambient pressure falls, as in diastole or muscle relaxation, once the spring force exceeds the magnet force, the membrane jumps to its position at the start of the cycle, inducing a useable emf in the coil. It is one of the main advantages of the invention that this emf is great enough to be stored directly, saving a space and weight and energy wasting transformer. From the magnet and spring force diagram it may be deduced that most of the energy available from the ambient pressure change is converted when the armature jumps outwards, thus permitting the use of one diode, causing only half the voltage drop as compared to a full wave rectifier.

The output cable may be 2-conductor or 1-conductor if the housing is used as ground.

FIG. 3 shows one of the many applications of the invention, integrated in a transvenous pacemaker electrode 17–18, the front end 14 of the housing is replaced by a means like the rear 15; the electric energy from the converter 16 is transferred via cable 17 to an energy storage like FIG. 4, feeding, instead of batteries, a usual pacemaker, feeding tip 20.

The energy storage shown in FIG. 4 works as follows: The electric energy generated in the coil 9 is conducted in the cable 3 directly or via a diode 21 to a capacitor 22 forming a resonance circuit with the coil 9 and tuned to the resonance frequency of the membrane 2 with armature 8; when the maximum voltage at the capacitor 22 is reached or later, an electronic switch 23 connects it with the storage capacitor 24.

I claim:

1. A medical energy converter implanted in a vessel, a heart ventricle or in muscle comprising: an elongate, thin housing with one side forming an integral, resilient membrane having corrugations around the membrane area and having a predetermined spring constant; a reluctance generator having a magnetic circuit comprising a core with spaced yokes, an armature mounted on said membrane in spaced relation to said yokes and a magnet whose force balances said spring force such that at increasing ambient pressure, the armature moves closer to the yokes and finally latches and at decreasing ambient pressure, the armature is released, jumping outwards; a coil for converting reluctance changes to electric energy and means for applying said energy to the body, the housing being filled with gas and sealed.

2. The invention as defined in claim 1, in which said applying means includes a capacitor forming a resonance circuit with said coil which is tuned to the resonance of the membrane and said armature, a diode connecting said coil and the resonance capacitor, a storage capacitor, an electronic switch connecting the resonance capacitor approximately at its maximum voltage to the storage capacitor and means for conducting energy from the storage capacitor to the body.

3. The invention as defined in claim 2 wherein said conducting means is a transvenous pacemaker electrode containing said housing.

* * * * *